(12) United States Patent
Veling et al.

(10) Patent No.: US 10,414,938 B2
(45) Date of Patent: Sep. 17, 2019

(54) AQUEOUS POLYMER DISPERSION FOR PAPER WITH A COPOLYMER OF VINYL ACETATE AND AN ACRYLATE MONOMER

(71) Applicant: BASF SE, Ludwigshafen (DE)

(72) Inventors: Nico Veling, Heidelberg (DE); Lucia Jimenez Garcia, Mannheim (DE); Dirk Lawrenz, Hassloch (DE)

(73) Assignee: BASF SE, Ludwigshafen (DE)

( * ) Notice: Subject to any disclaimer, the term of this patent is extended or adjusted under 35 U.S.C. 154(b) by 22 days.

(21) Appl. No.: 15/303,415

(22) PCT Filed: Apr. 7, 2015

(86) PCT No.: PCT/EP2015/057454
§ 371 (c)(1),
(2) Date: Oct. 11, 2016

(87) PCT Pub. No.: WO2015/155157
PCT Pub. Date: Oct. 15, 2015

(65) Prior Publication Data
US 2017/0029651 A1 Feb. 2, 2017

(30) Foreign Application Priority Data
Apr. 11, 2014 (EP) .................................... 14164343

(51) Int. Cl.
| | | |
|---|---|---|
| *C09D 131/04* | (2006.01) | |
| *B05D 3/02* | (2006.01) | |
| *B05D 3/12* | (2006.01) | |
| *C09D 7/61* | (2018.01) | |
| *C09D 5/00* | (2006.01) | |
| *D21H 17/36* | (2006.01) | |
| *D21H 17/37* | (2006.01) | |
| *D21H 19/56* | (2006.01) | |
| *D21H 19/58* | (2006.01) | |
| *D21H 19/60* | (2006.01) | |
| *D21H 19/64* | (2006.01) | |
| *D21H 21/18* | (2006.01) | |
| *C08F 218/08* | (2006.01) | |
| *C08L 31/04* | (2006.01) | |
| *C08F 220/02* | (2006.01) | |
| *C08F 220/06* | (2006.01) | |
| *C08F 220/18* | (2006.01) | |
| *C08F 220/32* | (2006.01) | |
| *C08F 228/02* | (2006.01) | |
| *C08K 3/26* | (2006.01) | |

(52) U.S. Cl.
CPC ......... *C09D 131/04* (2013.01); *B05D 3/0263* (2013.01); *B05D 3/12* (2013.01); *C08F 218/08* (2013.01); *C08L 31/04* (2013.01); *C09D 5/00* (2013.01); *C09D 7/61* (2018.01); *D21H 17/36* (2013.01); *D21H 17/37* (2013.01); *D21H 19/56* (2013.01); *D21H 19/58* (2013.01); *D21H 19/60* (2013.01); *D21H 19/64* (2013.01); *D21H 21/18* (2013.01); *B05D 2203/22* (2013.01); *B05D 2502/00* (2013.01); *B05D 2601/02* (2013.01); *C08K 3/26* (2013.01); *C08K 2003/265* (2013.01); *C08L 2201/54* (2013.01)

(58) Field of Classification Search
None
See application file for complete search history.

(56) References Cited

U.S. PATENT DOCUMENTS

| | | | |
|---|---|---|---|
| 4,269,749 A | 5/1981 | Marriott et al. | |
| 4,609,704 A | 9/1986 | Hausman et al. | |
| 2004/0175589 A1* | 9/2004 | Rabasco | C08F 210/02 428/511 |
| 2009/0250183 A1* | 10/2009 | Hayes | D21H 19/10 162/168.1 |
| 2010/0236736 A1* | 9/2010 | Brockmeyer | C08F 2/26 162/168.2 |
| 2012/0214007 A1* | 8/2012 | Daniels | D21H 19/56 428/452 |
| 2016/0115649 A1* | 4/2016 | Shi | C08F 2/22 428/447 |

FOREIGN PATENT DOCUMENTS

| | | |
|---|---|---|
| CN | 1526746 A | 9/2004 |
| CN | 101213215 A | 7/2008 |
| CN | 103370383 A | 10/2013 |
| GB | 1 356 030 A | 6/1974 |
| GB | 1 363 432 A | 8/1974 |
| WO | WO 2014/036740 A1 | 3/2014 |

OTHER PUBLICATIONS

International Search Report dated Jun. 9, 2015 in PCT/EP2015/057454.
Written Opinion dated Jun. 9, 2015 in PCT/EP2015/057454.

* cited by examiner

*Primary Examiner* — Kelly M Gambetta
(74) *Attorney, Agent, or Firm* — Oblon, McClelland, Maier & Neustadt, L.L.P.

(57) ABSTRACT

The invention relates to a process for preparing an aqueous dispersion of a polymer P, which comprises the emulsion polymerization of vinyl acetate, an acrylate monomer, which is a $C_1$-$C_{10}$ alkyl acrylate or a $C_1$-$C_{10}$ methacrylate, an α,β-ethylenically unsaturated $C_3$-$C_8$ carboxylic acid, glycidyl methacrylate or glycidyl acrylate, optionally an ethylenically unsaturated sulfonic acid and optionally an ethylenically unsaturated other monomer. Furthermore, the aqueous polymer dispersion obtainable from this process and a powder form thereof are disclosed. They are useful for a paper coating slip containing one of the aforementioned forms. A paper or a cardboard, which is coated with the paper coating slip, shows surface strength, which is expressed by a good dry pick resistance, a good wet pick resistance or good offset test results. The aqueous polymer dispersion or the powder form thereof is furthermore useful as a binder.

7 Claims, No Drawings

AQUEOUS POLYMER DISPERSION FOR PAPER WITH A COPOLYMER OF VINYL ACETATE AND AN ACRYLATE MONOMER

The current invention relates to a process for preparing an aqueous dispersion of a copolymer of vinyl acetate and an acrylate monomer, the aqueous polymer dispersion obtainable from this process and a powder form thereof, a paper coating slip containing one of the aforementioned forms, an use of the aqueous polymer dispersion or a powder form thereof as a binder, a process for coating a paper or a cardboard and a paper or a cardboard obtainable from the process for coating.

Aqueous polymer dispersions obtainable by free-radically initiated emulsion polymerization of ethylenically unsaturated, free-radically polymerizable monomers have a variety of use destinations. Binders for paper coating slips, for instance, are known that are based on copolymers of vinylaromatic monomers such as, for example, styrene, aliphatic dienes such as, for example, 1,3-butadiene, and ethylenically unsaturated acids such as, for example, acrylic acid or methacrylic acid, or based on styrene-acrylate copolymers.

An alternative to the aforementioned copolymers based on vinylaromatic monomers, especially styrene, are copolymers with vinyl acetate as the main monomer based on the sum of involved monomers.

GB 1356030 A discloses synthetic binders suitable for compositions intended for the coating and/or impregnation especially of paper and cardboard. There are provided aqueous dispersions of a single copolymer, of which the K value (specific viscosity) is from 40 to 120, which dispersion thickens in the presence of an alkaline agent without forming a solution and which copolymer contains in an interpolymerized form 10 to 87 wt. % of one or more esters of acrylic acid or methacrylic acid and an $C_1$-$C_{18}$ alcohol, 87 to 10 wt. % of one or more ethylenically unsaturated monomers, other than the aforementioned esters, capable of forming homopolymers insoluble in water, 3 to 12 wt. % of one or more alkene mono- or dicarboxylic acids or one or more monoalkyl esters of such dicarboxylic acids and 0 to 20 wt. % of one or more monomers containing either an ethylenic linkage and a polar group or a plurality of ethylenic linkages, the pH of the dispersion being from 2 to 5 and the solids content of the dispersion being from 30% to 60% by weight, said dispersion being prepared by copolymerising the monomers in aqueous phase at a pH from 2 to 7 in the presence of 0.01 to 3 wt. % in relation to the monomers of a polymerization catalyst capable of producing free radicals and of 0.05 to 5 wt. % in relation to the monomers of a chain transfer agent. Further disclosed is inter alia a copolymer of vinyl acetate, butyl acrylate, acrylic acid and either N-hydroxymethyl acrylamide or ethyleneglycol dimethacrylate, said copolymer being prepared in the presence of 1.0 parts of tertiary dodecylmercaptan.

U.S. Pat. No. 4,609,704 discloses an aqueous emulsion copolymer binder as a coating for paper and consisting essentially of (a) a vinyl ester of a $C_1$-$C_{12}$ alkanoic acid, (b) 2 to 50 wt. % of an $C_1$-$C_8$ alkyl acrylate and (c) 0.1 to 10 wt. % of an ethylenically unsaturated $C_3$-$C_{10}$ mono- or dicarboxylic acid or the half ester of such dicarboxylic ester with a $C_1$-$C_{18}$ alkanol. The copolymer may also contain up to 15 wt. % of an olefinically unsaturated copolymerizable monomer. Further disclosed is inter alia a copolymer of vinyl acetate, butyl acrylate, maleic acid anhydride and dicyclopentadienyl acrylate.

Despite of the known copolymers with vinyl acetate as the main monomer, there is still a need for copolymers leading to good performance characteristics as a polymeric binder with a high binding force or for paper coating slips comprising polymeric binders, which lead to coated papers having good surface strength, for example good dry pick resistance and good wet pick resistance.

It is an object of the present invention to provide aqueous polymer dispersions, which have a high binding force, in particular good performance characteristics when used as a binder in paper coating slips, more particularly providing surface strength to the coated paper, which is expressed by a good dry pick resistance, a good wet pick resistance or good offset test results. Ideally, at least two or all of the aforementioned surface strength parameters of the coated paper are in a favorable balance.

The object is achieved, according to the invention, by a process for preparing an aqueous dispersion of a polymer P, which comprises the steps of
providing the monomers
(a) vinyl acetate,
(b) at least one acrylate monomer, which is a $C_1$-$C_{10}$ alkyl acrylate or a $C_1$-$C_{10}$ alkyl methacrylate,
(c) at least one α,β-ethylenically unsaturated $C_3$-$C_6$ carboxylic acid,
(d) glycidyl methacrylate or glycidyl acrylate,
(e) optionally at least one ethylenically unsaturated sulfonic acid, and
(f) optionally at least one ethylenically unsaturated other monomer, which is different to the monomers (a), (b), (c), (d) or (e),
emulsifying the monomers in an aqueous medium, and
polymerizing the monomers in the presence of a free-radical initiator,
wherein
the content of vinyl acetate is from 70 to 95 parts by weight of the monomers,
the content of the at least one acrylate monomer is from 5 to 25 parts by weight of the monomers,
the content of the at least one α,β-ethylenically unsaturated $C_3$-$C_6$ carboxylic acid is from 0.1 to 10 parts by weight of the monomers,
the content of glycidyl methacrylate or glycidyl acrylate is from 0.1 to 10 parts by weight of the monomers,
the optional content of the at least one ethylenically unsaturated sulfonic acid is from 0.1 to 5 parts by weight of the monomers,
the optional content of the at least one other ethylenically unsaturated monomer is from 0.1 to 15 parts by weight of the monomers, and
the sum total of the parts by weight of the monomers (a), (b), (c), (d), (e) and (f) is 100.

Preferably, the content of vinyl acetate is from 75 to 85 parts by weight of the monomers to be polymerized, i.e. monomers (a) to (d) and optionally (e), (f) or both of them, in particular from 78 to 83 parts by weight, wherein the sum total of the parts by weight of the monomers (a), (b), (c), (d), (e) and (f) is 100. Especially, the content of vinyl acetate is from 70 to 94.7 parts by weight, in particular from 70 to 85 parts by weight.

An acrylate monomer, which is a $C_1$-$C_{10}$ alkyl acrylate or a $C_1$-$C_{10}$ alkyl methacrylate, is for example methyl acrylate, ethyl acrylate, propyl acrylate, 1-methylethyl acrylate, n-butyl acrylate, 1-methylpropyl acrylate, 2-methylpropyl acrylate, 1,1-dimethylethyl acrylate, n-pentyl acrylate, 1-methylbutyl acrylate, 3-methylbutyl acrylate, n-hexyl acrylate, n-octyl acrylate, 1-methylheptyl acrylate, 2-ethylhexyl acrylate, 1,1,3,3-tetramethylbutyl acrylate, 2-ethylheptyl acrylate, methyl methacrylate, ethyl methacrylate, propyl methacrylate, 1-methylethyl methacrylate, n-butyl methacrylate, 1-methylpropyl methacrylate, 2-methylpropyl methacrylate, 1,1-dimethylethyl methacrylate, n-pentyl methacrylate, 1-methylbutyl methacrylate, 3-methylbutyl methacrylate, n-hexyl methacrylate, n-octyl methacrylate, 1-methylheptyl methacrylate, 2-ethylhexyl methacrylate, 1,1,3,3-tetramethylbutyl methacrylate or 2-ethylheptyl methacrylate. A mixture of $C_1$-$C_{10}$ alkyl acrylates or $C_1$-$C_{10}$ alkyl methacrylates is also suitable. Preferred is methyl methacrylate, methyl acrylate, n-butyl acrylate, ethyl acrylate or 2-ethylhexyl acrylate, in particular n-butyl acrylate.

Preferably, the content of the at least one acrylate monomer, which is a $C_1$-$C_{10}$ alkyl acrylate or a $C_1$-$C_{10}$ alkyl methacrylate, is from 7 to 19 parts by weight of the monomers to be polymerized, i.e. monomers (a) to (d) and optionally (e), (f) or both of them, in particular from 9 to 16 parts by weight, wherein the sum total of the parts by weight of the monomers (a), (b), (c), (d), (e) and (f) is 100.

An $\alpha,\beta$-ethylenically unsaturated $C_3$-$C_6$ carboxylic acid is for example acrylic acid, methacrylic acid, itaconic acid, crotonic acid (trans-butenoic acid), isocrotonic acid (cis-butenoic acid), vinylacetic acid, (E)-4-methoxy-4-oxo-but-2-enoic acid, (Z)-4-ethoxy-4-oxo-but-2-enoic acid, vinylacetic acid, maleic acid, 2-methylmaleic acid or aconitic acid. A mixture of $\alpha,\beta$-ethylenically unsaturated $C_3$-$C_6$ carboxylic acids is also suitable. Dependent on the pH value, the carboxylic acid group can be deprotonated to be in the form of an anion, which forms with a cationic counterion a salt. The cationic counterion is for example a sodium ion, a potassium ion, a magnesium ion, a calcium ion, ammonium or an alkylated ammonium. Dependent on the pH value, an $\alpha,\beta$-ethylenically unsaturated $C_3$-$C_6$ carboxylic acids, which structurally allows a cyclic anhydride form such as maleic acid, itaconic and aconitic acid, can be in its cyclic anhydride form. Preferred is acrylic acid, methacrylic acid or itaconic acid, in particular acrylic acid or methacrylic acid.

Preferably, the content of the at least one $\alpha,\beta$-ethylenically unsaturated $C_3$-$C_6$ carboxylic acid is from 0.5 to 5 parts by weight of the monomers to be polymerized, i.e. monomers (a) to (d) and optionally (e), (f) or both of them, in particular from 0.5 to 3 parts by weight, wherein the sum total of the parts by weight of the monomers (a), (b), (c), (d), (e) and (f) is 100.

Preferably, the content of glycidyl methacrylate or glycidyl acrylate is from 0.5 to 8 parts by weight of the monomers to be polymerized, i.e. monomers (a) to (d) and optionally (e), (f) or both of them, in particular from 0.7 to 6 parts by weight, wherein the sum total of the parts by weight of the monomers (a), (b), (c), (d), (e) and (f) is 100.

An ethylenically unsaturated sulfonic acid is for example vinyl sulfonic acid, 2-acrylamido-2-methylpropane sulfonic acid, 3-sulfopropyl acrylate, 3-sulfopropyl methacrylate, para-vinylphenyl sulfonic acid, meta-vinyl sulfonic acid or ortho-vinylphenyl sulfonic acid. A mixture of ethylenically unsaturated sulfonic acids is also suitable. Dependent on the pH value, the sulfonic acid group can be deprotonated to be in the form of an anion, which forms with a cationic counterion a salt. The cationic counterion is for example a sodium ion, a potassium ion, a magnesium ion, a calcium ion, an ammonium or an alkylated ammonium. Preferred is vinyl sulfonic acid or 2-acrylamido-2-methylpropane sulfonic acid, in particular vinyl sulfonic acid.

Preferably, the content of the at least one ethylenically unsaturated sulfonic acid is from 0.1 to 2 parts by weight of the monomers to be polymerized, i.e. monomers (a) to (d) and optionally (e), (f) or both of them, in particular from 0.1 to 1 parts by weight, wherein the sum total of the parts by weight of the monomers (a), (b), (c), (d), (e) and (f) is 100.

An ethylenically unsaturated other monomer, which is different to the monomers (a) vinyl acetate, (b) an acrylate monomer, which is a $C_1$-$C_{10}$ alkyl acrylate or a $C_1$-$C_{10}$ alkyl methacrylate, (c) an $\alpha,\beta$-ethylenically unsaturated $C_3$-$C_6$ carboxylic acid, (d) glycidyl methacrylate or glycidyl acrylate, or (e) an ethylenically unsaturated sulfonic acid, is for example a vinylaromatic compound such as styrene or methylstyrene, an ethylenically unsaturated carboxamide such as acrylamide or methacrylamide, an ethylenically unsaturated carbonitrile such as acrylonitrile or methacrylonitrile, a vinyl ester of a saturated $C_2$-$C_{18}$-carboxylic acid, a $C_{11}$-$C_{18}$ alkyl acrylate, a $C_1$-$C_{18}$ alkyl methacrylate, a cycloalkyl acrylate, a cycloalkyl methacrylate, an allyl ester of a saturated carboxylic acid, a vinyl ether, a vinyl ketone, a dialkyl ester of an ethylenically unsaturated dicarboxylic acid, N-vinylpyrrolidone, N-vinylpyrrolidine, N-vinylformamide, a N,N-dialkylaminoalkylacrylamide, a N,N-dialkylaminoalkylmethacrylamide, a N,N-dialkylaminoalkyl acrylate, a N,N-dialkylaminoalkyl methacrylate, ureido methacrylate, ureido acrylate, vinylphosphonic acid, vinyl chloride, vinylidene chloride, an alkene such as ethylene or propylene including a conjugated aliphatic diene such as butadiene or isoprene, a cycloalkene such as cyclohexene including a conjugated aliphatic cyclodiene such as cyclopentadiene, or a crosslinking monomer having two or more ethylenic double bonds, wherein at least two of the double bonds are not conjugated, such as allyl methacrylate, allyl acrylate or an alkanediol diacrylate like butanediol diacrylate, a polyethylene glycol diacrylate, an alkane triol triacrylate or pentaerythritol tetracrylate. A mixture of unsaturated other monomers is also suitable. Preferred is an ethylenically unsaturated other monomer, which is monoethylenically unsaturated or is allyl methacrylate or allylacrylate. Preferred is an alkene, a cycloalkene, a conjugated aliphatic $C_4$-$C_9$ diene, an ester of vinyl alcohol and a $C_2$-$C_{15}$ monocarboxylic acid, a $C_5$-$C_{10}$ cycloalkyl acrylate, a $C_5$-$C_{10}$ cycloalkyl methacrylate, di($C_1$-$C_{10}$ alkyl) maleinate, di($C_1$-$C_{10}$ alkyl) fumarate, a vinylaromatic compound, an ethylenically unsaturated $C_3$-$C_8$-monocarbonitrile, an ethylenically unsaturated $C_4$-$C_8$-dicarbonitrile, an ethylenically unsaturated $C_3$-$C_8$ monocarboxamide, an ethylenically unsaturated $C_4$-$C_8$ dicarboxamide, ureido methacrylate, ureido acrylate, allyl methacrylate or allyl acrylate. In particular preferred is an alkene, a cycloalkene, an ester of vinyl alcohol and a $C_2$-$C_{15}$ monocarboxylic acid, a $C_5$-$C_{10}$ cycloalkyl acrylate, a $C_5$-$C_{10}$ cycloalkyl methacrylate, di($C_1$-$C_{10}$ alkyl) maleinate, di($C_1$-$C_{10}$ alkyl) fumarate, an ethylenically unsaturated $C_3$-$C_8$-monocarbonitrile, an ethylenically unsaturated $C_4$-$C_8$-dicarbonitrile, an ethylenically unsaturated $C_3$-$C_8$ monocarboxamide, an ethylenically unsaturated $C_4$-$C_8$ dicarboxamide, ureido methacrylate, ureido acrylate, allyl methacrylate or allyl acrylate. Very particularly preferred is an alkene, a cycloalkene, an ester of vinyl alcohol and a $C_2$-$C_{15}$ monocarboxylic acid, a $C_5$-$C_{10}$ cycloalkyl acrylate, a $C_5$-$C_{10}$ cycloalkyl methacrylate, di($C_1$-$C_{10}$ alkyl) maleinate, di($C_1$-$C_{10}$ alkyl) fumarate, an ethylenically unsaturated $C_3$-$C_8$-monocarbonitrile, an ethylenically unsaturated $C_4$-$C_8$-dicarbonitrile, an ethylenically unsaturated $C_3$-$C_8$ monocarboxamide or an ethylenically unsaturated $C_4$-$C_8$ dicarboxamide.

Preferred is a process for preparing an aqueous dispersion of a polymer P, wherein the ethylenically unsaturated other monomer, which is different to the monomers (a), (b), (c), (d) or (e), is also different to a vinylaromatic compound or a conjugated aliphatic diene.

Preferably, the content of the at least one ethylenically unsaturated other monomer, which is different to the monomers (a), (b), (c), (d) or (e), is from 0.1 to 10 parts by weight of the monomers to be polymerized, i.e. monomers (a) to (d) and optionally (e), (f) or both of them, in particular from 0.1 to 7 parts by weight, wherein the sum total of the parts by weight of the monomers (a), (b), (c), (d), (e) and (f) is 100.

The process comprising the steps of providing the monomers, of emulsifying the monomers in an aqueous medium and of polymerizing the monomers in the presence of a free-radical initiator, is known as free-radical emulsion polymerization. The steps of providing the monomers, of emulsifying the monomers in an aqueous medium and of polymerizing the monomers in the presence of a free-radical initiator can be conducted in parallel. For example, parts or all of the monomers to be polymerized, i.e. monomers (a) to (d) and optionally (e), (f) or both of them, are fed over a certain time to a reactor, where emulsification in an aqueous medium and polymerization already takes place.

The step of polymerizing the monomers in the presence of a free-radical initiator takes place preferably in a reactor. The medium for polymerizing the monomers in the presence of a free-radical initiator contains water and the aqueous medium for emulsifying the monomers forms typically at least a part of the medium for polymerizing the monomers in the presence of a free-radical initiator.

The monomers are emulsified during the process in an aqueous medium, i.e. they are dispersed in the aqueous medium supported for example by external stirring of the resulting mixture. The emulsifying of the monomers in an aqueous medium can take place in the same reactor, where the polymerizing occurs, or can be conducted in a separate apparatus with a subsequent transfer of the at least partly emulsified monomers to the reactor, where the polymerizing occurs. In the latter situation, the emulsification of the monomers continues in the reactor, where the polymerizing occurs. The monomers can also be fed already emulsified to the reactor, where the polymerizing occurs.

Preferably, the majority of the monomers is present in a liquid state at the process once polymerizing occurs.

The aqueous medium contains for example water, which is demineralized. The aqueous medium can contain a further solvent as diluent or to modify the solubility of the monomers. The further solvent is non-polymerizable under the applied process conditions, liquid at 21° C. and at 101.32 kPa, and is for example an alcohol such as methanol, ethanol, n-propanol or isopropanol, n-butanol or isobutanol, or a ketone such as acetone, methyl ethyl ketone, diethyl ketone or isobutyl methyl ketone. A mixture of further solvents is also suitable. Preferred is an aqueous medium, which content of a further solvent is below 10% by weight based on the overall amount of water and the further solvent in the process, in particular below 1%.

A non-polymerizable component in the process is understood as a component, which does not act as a monomer for the polymer P under the conditions of an aqueous radically initiated emulsion polymerization, i.e. even if the component is covalently incorporated into the polymer P, the polymer chain growth is stopped by the component. In contrast, a monomer for the polymer P enables after its covalent incorporation a further polymer chain growth, i.e. the reaction with a further monomer.

In order to promote the dispersing of the monomers in the aqueous medium, a dispersing auxiliary can be used. The dispersing auxiliary serves also to support the stabilization of the aqueous dispersion of the polymer P by keeping the formed particles of the polymer P dispersed. A dispersing auxiliary is an emulsifier, a protective colloid or a mixture of both of them. The emulsifier and the protective colloid are differentiated by their weight-average molar mass $M_w$. An emulsifier has a weight-average molar mass $M_w$ in general below 2000, while the weight-average molar mass $M_w$ of the protective colloid may be up to 50 000, in particular from above 2000 to up to 50000. Preferably, the dispersing aid is an emulsifier.

A suitable emulsifier is a surface-active substance. An emulsifier is non-ionic, anionic, or cationic. In case of employing a mixture of emulsifiers, their compatibility has to assured, which can be evaluated in case of doubt by preliminary tests. Typically, an anionic emulsifier is compatible with another anionic emulsifier or a non-ionic emulsifier. Similarly, a cationic emulsifier is typically compatible with another cationic emulsifier or a non-ionic emulsifier.

A non-ionic emulsifier is for example an ethoxylated $C_8$-$C_{36}$ fatty alcohol having a degree of ethoxylation of from 3 to 50 (=ethylene oxide units [EO]: 3-50), an ethoxylated mono-, di- and tri-$C_4$-$C_{12}$ alkylphenol having a degree of ethoxylation of from 3 to 50. A customary nonionic emulsifier is for example an Emulgin B grade (a cetyl/stearyl alcohol ethoxylate, RTM BASF), a Dehydrol LS grade (a fatty alcohol ethoxylate, EO units: 1-10, RTM BASF), a Lutensol A grade (a $C_{12}C_{14}$-fatty alcohol ethoxylate, EO units: 3-8, RTM BASF), a Lutensol AO grade (a $C_{13}C_{15}$-oxo alcohol ethoxylate, EO units: 3-30), a Lutensol AT grade (a $C_{16}C_{18}$-fatty alcohol ethoxylate, EO units: 11-80), a Lutensol ON grade (a $C_{10}$-oxo alcohol ethoxylate, EO units: 3-11) or a Lutensol TO grade (a $C_{13}$-oxo alcohol ethoxylate, EO units: 3-20).

An anionic emulsifier is for example an alkali metal salt of a dialkyl ester of sulfosuccinic acid, an alkali metal ion or ammonium salt of a $C_8$-$C_{12}$ alkyl sulfate, an alkali metal ion or ammonium salt of a $C_{12}$-$C_{18}$ alkylsulfonic acid, an alkali metal ion or ammonium salt of a $C_9$-$C_{18}$ alkylarylsulfonic acid, a sulfuric acid monoester of an ethoxylated $C_{12}$-$C_{18}$ alkanol (EO units: 4-30) or a sulfuric acid monoester of an ethoxylated ($C_4$-$C_{12}$ alkyl)phenol (EO units: 3-50).

As further anionic emulsifiers, compounds of the general formula I

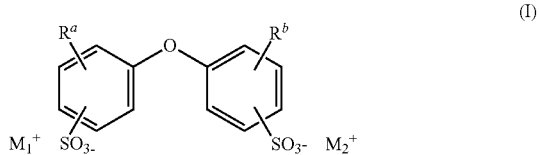

wherein $R^a$ and $R^b$ are each a H atom or $C_4$-$C_{24}$-alkyl and are not both H atoms at the same time, and $M_1^+$ and $M_2^+$ can be alkali metal ions and/or ammonium, are also useful. In the general formula I, $R^a$ and $R^b$ are preferably linear or branched alkyl radicals having from 6 to 18 carbon atoms, in particular 6, 12 or 16 carbon atoms, or hydrogen atoms, where $R^a$ and $R^b$ are not both hydrogen atoms at the same time. $M_1^+$ and $M_2^+$ are preferably sodium, potassium or ammonium, with sodium being particularly preferred. A compound of general formula I, in which $M_1^+$ and $M_2^+$ are both sodium, $R^a$ is a branched alkyl radical having 12 carbon atoms and $R^b$ is hydrogen or $R^a$ is particularly advantageous. Use is frequently made of industrial mixtures which have a proportion of from 50 to 90% by weight of the monoalkylated product, for example Dowfax® 2A1 (RTM The Dow Chemical Corp.). The compounds of general formula I are commonly known, e.g. from U.S. Pat. No. 4,269,749, and commercially available.

A comprehensive description of suitable emulsifiers may be found in Houben-Weyl, Methoden der organischen Chemie, volume XIV/1, Makromolekulare Stoffe, Georg-Thieme-Verlag, Stuttgart, 1961, pages 192 to 208.

Similar to an emulsifier, a protective colloid is non-ionic, anionic or cationic. A protective colloid is for example a poly(vinyl alcohol), a poly(alkylene glycol), poly(acrylic acid) or an alkali metal salt thereof, a poly(methacrylic acid) or an alkali metal salt thereof, or a gelatin derivative. An anionic protective colloid can also be a copolymer, which is different to the polymer P, containing at least one of acrylic acid, methacrylic acid, maleic acid, 2-acrylamido-2-methylpropane sulfonic acid, para-vinylphenyl sulfonic acid and salt forms thereof, preferably an alkali metal salt thereof, in polymerized form. A cationic protective colloid is for example a homopolymer or a copolymer, which is different to the polymer P, and the N-protonated or N-alkylated derivative of a homopolymer or a copolymer of N-vinylpyrrolidone, N-vinylformamide in its at least partly hydrolysed form, N-vinylacetamide in its at least partly hydrolysed form, N-vinylcarbazole, 1-vinylimidazole, 2-vinylimidazole, 2-vinylpyridine, 4-vinylpyridine or an amine-group-bearing acrylate, methacrylate, acrylamide or methacrylamide, wherein the nitrogen of the amine-group is protonated at a pH below 7 or is alkylated.

A comprehensive description of suitable protective colloids may be found in Houben-Weyl, Methoden der organischen Chemie, volume XIV/1, Makromolekulare Stoffe, Georg-Thieme-Verlag, Stuttgart, 1961, pages 411 to 420.

Preferred for the process for preparing an aqueous dispersion of a polymer P is the presence of a dispersing aid, which is an emulsifier, in particular an anionic emulsifier and very particular an anionic emulsifier with a weight-average molar mass $M_w$ below 1000.

For polymerizing the monomers in the presence of a free-radical initiator, the aqueous medium, which can comprise a protective colloid and/or an emulsifier in dissolved form and optionally a polymer seed, is preferably heated to the temperature at which the polymerization of the monomers is to take place or to a temperature which is, for example, from 5 to 20° C. below the polymerization temperature. The free-radical initiator can be fed in parallel to the monomers or for example parts of the free-radical initiator are added initially at once, for example 15% or 30% by weight of the overall amount of the free-radical initiator. For example, as soon as the polymerization temperature desired is reached or within a time span of from 1 to 15 minutes, preferably from 5 to 15 minutes, after the polymerization temperature is reached, the metering of the monomers to be polymerized is started. They can be fed continuously within, for example, from 60 minutes to 10 hours, in general within from 2 to 4 hours. It is also possible for example for 1% to 10% by weight of all or parts of the monomers to be included in the initial charge in addition to the free-radical initiator and the optional polymer seed. The remaining monomers and the remaining initiator are then metered separately into the initial charge under polymerization conditions after the polymerization has started.

The temperature for polymerizing the monomers in the presence of a free-radical initiator is chosen at least so high that the specifically employed free-radical initiator generates free radicals. Other criteria for the temperature might apply in addition. The temperature is for example from 50 to 130° C., in particular from 60 to 100° C. The polymerizing of the monomers can be carried out under a pressure, which is above atmospheric pressure, for example at pressures up to 15 bar, for example in the range from 2 to 10 bar.

The polymerizing of the monomers in the presence of a free-radical initiator can be conducted under exclusion of oxygen, for example under an inert atmosphere such as nitrogen. Additionally, other steps of the process can be conducted under exclusion of oxygen, especially the step of emulsifying the monomers in an aqueous medium.

A free-radical initiator forms free radicals under the reaction conditions used in the process. A free-radical initiator is for example a peroxodisulfate, a peroxosulfate, an azo initiator, an organic peroxide, an organic hydroperoxide, hydrogen peroxide or a redox initiator system, which consists of at least one reducing agent and an oxidizing agent. It is understood that the free radical initiator can also be a high-energy radiation such as electron beams or irradiation with UV light, which leads to transformation of process components into free radicals. A mixture of free radical initiators is also suitable. An example of a peroxodisulfate is sodium peroxodisulfate, potassium peroxodisulfate or ammonium peroxodisulfate. An example of a peroxosulfate is sodium peroxosulfate, potassium hydrogenperoxosulfate or potassium peroxosulfate. An example for an azo initiator is 2,2'-azobis(4-methoxy-2,4-dimethylvaleronitrile), 2,2'-azobis(2,4-dimethylvaleronitrile), 2,2'-azobis(2-amidinopropane) dihydrochloride, 2,2'-azobis(isobutyronitrile), 2,2'-azobis(2-methylbutyronitrile) or 2,2'-azobis(N,N'-dimethyleneisobutyramidine) dihydrochloride. An example for an organic peroxide is dibenzoyl peroxide, tert-butyl perpivalate, tert-butyl-per 2-ethylhexanoate, di-tert-butyl peroxide, diamyl peroxide, dioctanoyl peroxide, didecanoyl peroxide, dilauroyl peroxide, bis(o-toluyl) peroxide, succinyl peroxide, tert-butyl peracetate, tert-butyl permaleate, tert-butyl perisobutyrate, tert-butyl peroctanoate or tert-butyl perbenzoate. An example of an organic hydroperoxide is tert-butyl hydroperoxide. An example of a redox initiator system's oxidizing agent is the above mentioned free radical initiator with the exception of high-energy radiation. An example of a redox initiator's reducing agent is an alkali metal salt of sulfurous acid such as sodium sulfite or sodium hydrogen sulfite, an alkali metal salt of disulfurous acid such as sodium disulfite, an bisulfite adduct of an aliphatic aldehyde or ketone such as acetone bisulfite, hydroxymethanesulfinic acid and salts thereof or ascorbic acid. The redox initiator system can be used with concomitant use of a soluble metal compound, whose metallic component can occur in a plurality of valency states. An example for a redox initiator system is ascorbic acid/iron(II) sulfate/sodium peroxodisulfate, tert-butyl hydroperoxide/sodium disulfite, tert-butyl hydroperoxide/sodium hydroxymethanesulfinic acid or tert-butyl hydroperoxide/ascorbic acid. The individual components, for example the reducing agent, may also be a mixture such as a mixture of the sodium salt of hydroxymethanesulfinic acid and sodium disulfite.

The free-radical initiator is preferably used in the form of an aqueous solution, the lower concentration being determined by the amount of water acceptable in the dispersion and the upper concentration by the solubility of the relevant compound in water. Preferred is a water-soluble free-radical initiator, in particular sodium peroxosulfate, potassium peroxosulfate, ammonium peroxosulfate, sodium peroxodisulfate, potassium peroxodisulfate or ammonium peroxodisulfate.

The free-radical initiator is used for example in an amount—unless it is high energy radiation—of up to 2% by weight, preferably of at least 0.1% by weight, in particular from 0.1 to 1.5% by weight based on the sum total weight of the monomers to be polymerized, i.e. monomers (a) to (d) and optionally (e), (f) or both of them.

In the process, the step of polymerizing the monomers in the presence of a free-radical initiator can be followed by a step of removing residual, unreacted monomers. The removal of residual, unreacted monomers is conducted until the desired residual amount of one or more of the employed monomers is achieved. The step of removal of residual, unreacted monomers can be for example an aftertreating of the polymerized monomers with a further radical initiator or an aftertreating of the aqueous dispersion of polymer P by distillation, for example steam distillation. At aftertreating of the polymerized monomers with a further radical initiator, the initially formed reaction product, i.e. the polymerized monomers (a) to (d) and optionally (e), (f) or both of them, is subjected to an aftertreatment after the actual polymerization and is reacted with a further radical initiator. This further radical initiator can be the free-radical initiator of the step of polymerizing the monomers or a different free-radical initiator. Preferably, the further radical initiator generates nonionic radicals, in particular hydroxyl radicals or alkoxy radicals. A hydroxyl radical is formed for example from hydrogen peroxide or an organic hydroperoxide. An alkoxy radical is formed for example from an organic alkyl peroxide. A further radical initiator, which forms non-ionic radicals, is for example hydrogen peroxide, dibenzoyl peroxide, tert-butyl perpivalate, tert-butyl per-2-ethylhexanoate, di-tert-butyl peroxide, diamyl peroxide, dioctanoyl peroxide, didecanoyl peroxide, dilauroyl peroxide, bis(o-toluyl) peroxide, succinyl peroxide, tert-butyl peracetate, tert-butyl permaleate, tert-butyl perisobutyrate, tert-butyl per-n-octanoate, tert-butyl perbenzoate or tert-butyl hydroperoxide. A further radical initiator is preferably a peroxide compound, which is hydrogen peroxide, an organic hydroperoxide or an organic peroxide. Particularly preferred is a redox initiator system comprising the further radical initiator, which is a peroxide compound, which is hydrogen peroxide, an organic hydroperoxide or an organic peroxide, as oxidizing agent in combination with an inorganic or organic reducing agent. An inorganic or organic reducing agent is for example an alkali metal salt of sulfurous acid such as sodium sulfite or sodium hydrogen sulfite, an alkali metal salt of disulfurous acid such as sodium disulfite, a bisulfite adduct of an aliphatic aldehyde and a ketone such as an acetone bisulfite or a salt thereof or hydroxymethanesulfinic acid or a salt thereof, or ascorbic acid. The redox initiator systems for the aftertreatment can be used with concomitant use of a soluble metal compound, whose metallic component may occur in a plurality of valency states. A redox initiator system for the aftertreatment is for example tert-butyl hydroperoxide/sodium disulfite, tert-butyl hydroperoxide/sodium hydroxymethanesulfinic acid or tert-butyl hydroperoxide/ascorbic acid. The redox initiator system's oxidizing agent or reducing agent may also be a mixture, for example a mixture of the sodium salt of hydroxymethanesulfinic acid and sodium disulfite. Especially preferred is a further radical initiator, which is a redox initiator system of hydrogen peroxide/ascorbic acid or of tert-butyl hydroperoxide/ascorbic acid.

The amount of a further radical initiator, which is used for the aftertreatment, is for example from 0.001 to 0.1 parts by weight, in particular from 0.002 to 0.5 parts by weight, based on 100 parts by weight of the monomers to be polymerized, i.e. monomers (a) to (d) and optionally (e), (f) or both of them.

The addition of the further radical initiator for the aftertreatment is effected after the main polymerization of the monomers has taken place, i.e. after for example more than 70% by weight, in particular at least 90% by weight, very particularly 100% by weight, of all monomers have been added and more than 70% by weight, in particular at least 90% by weight, very particularly at least 95% of all monomers have undergone polymerization in the presence of a free-radical initiator. The aftertreatment with the further radical initiator is preferably effected at a temperature of at least 55° C., for example at 55 to 130° C., in particular of at least 65° C., for example at 65 to 85° C.

Preferred is a step of removing residual, unreacted monomers, which is an aftertreating of the polymerized monomers with a further radical initiator. Especially preferred is at this step a further radical initiator, which is hydrogen peroxide, an organic hydroperoxide or an organic peroxide. In particular, the further radical initiator is a redox initiator system of hydrogen peroxide/ascorbic acid or of tert-butyl hydroperoxide/ascorbic acid.

The glass transition temperature Tg of the resulting dispersed polymer P after removal of water from the aqueous dispersion is preferably in the range of 20° C. to 40° C. The glass transition temperature $T_g$ is to be understood as referring to the glass transition temperature limit to which the glass transition temperature tends with increasing molecular weight, according to G. Kanig (Kolloid-Zeitschrift & Zeitschrift für Polymere, vol. 190, page 1, equation 1). Glass transition temperature is determined by the norm ISO 11357-2. By purposive variation of monomer type and quantity, a person skilled in the art is able according to the present invention to prepare aqueous polymeric compositions the polymers of which have a glass transition temperature in the desired range. Orientation is possible by means of the Fox equation. According to Fox (T. G. Fox, Bull. Am. Phys. Soc. 1956 [Ser. II] 1, page 123 and according to Ullmann's Encyclopädie der technischen Chemie, vol. 19, page 18, 4th edition, Verlag Chemie, Weinheim, 1980), the glass transition temperature of an at most slightly cross-linked copolymer is given to a good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures in degrees Kelvin of the polymers constructed of just one of the monomers 1, 2, ... n at a time. The $T_g$ values are known for the homopolymers of most monomers and listed for example in Ullmann's Encyclopedia of Industrial Chemistry, vol. 5, Vol. A21, page 169, VCH Weinheim, 1992; further sources for glass transition temperatures of homopolymers are for example J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989. Additionally, the dispersion No. D1 in the examples provides a starting point. Preferred is a process for preparing an aqueous dispersion of a polymer P, wherein the monomers (a), (b), (c), (d), optionally (e), optionally (f) or optionally both of them are chosen in a way, that the polymer P, which is obtained after removal of water from the aqueous dispersion, possess a glass transition temperature in the range from 20° C. to 40° C. as determined by the norm ISO 11357-2.

The process can also be conducted in the presence of a polymer seed. A polymer seed is an aqueous dispersion of finely divided polymer particles. The weight average particle diameter of the polymer particles of the polymer seed is for example not more than 80 nm, particularly not more than 60 nm, very particularly not more than 50 nm or not more than 40 nm, especially preferred in the range from 20 to 40 nm. Determining the weight average particle diameter is known to a person skilled in the art and is effected for example via the method of an analytical ultracentrifuge. Weight average particle diameter herein is the weight average $D_{w50}$ value determined by the method of the analytical ultracentrifuge (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Maechtle, pages 147 to 175). It is advantageous for the polymer seed used to be monomodal and to have a narrow particle size distribution. Narrow particle size distribution herein is to be understood as meaning that the ratio of the weight average particle diameter $D_{w50}$ and number average particle diameter $D_{N50}$ determined by the method of the analytical ultracentrifuge [$D_{w50}/D_{N50}$] is not more than 2.0, preferably not more than 1.5 and more preferably not more than 1.2 or not more than 1.1. Preparing a polymer seed is known to a person skilled in the art and is typically effected by initially charging a relatively small amount of monomers and a relatively large amount of emulsifiers together with deionized water in a reaction vessel and adding a sufficient amount of polymerization initiator at the reaction temperature. The preference according to the present invention is for the use of a polymer seed having a glass transition temperature of not less than 50° C., particularly not less than 60° C., very particularly not less than 70° C., especially not less than 80° C. or not less than 90° C. Glass transition temperature for the polymer seed is determined by the norm ISO 11357-2. Particular preference is given to a polystyrene polymer seed or to a poly(methyl methacrylate) polymer seed. The amount of the polymer seed is based on the polymer solids content of the aqueous polymer seed dispersion. It is therefore reported as parts by weight of polymer seed solids per 100 parts by weight of monomers to be polymerized, i.e. monomers (a) to (d) and optionally (e), (f) or both of them. Preferably, a polymer seed is used in an amount of 0.1% to 4% by weight and more preferably 1 to 3% by weight of the monomers to be polymerized, i.e. monomers (a) to (d) and optionally (e), (f) or both of them. The polymer seed can partly or completely be charged to the aqueous medium prior to addition of the monomers to be polymerized, with the remainder if any, being added in the course of polymerizing the monomers. Preferably, all of the polymer seed is initially charged to the aqueous medium prior to polymerizing the monomers.

A solids content is herein understood as the weight obtained when a defined amount, for example 5 g, is dried at 140° C. in a drying cabinet to a constant weight.

The process can also be conducted in the presence of a starch derivative. A starch derivative is for example a native starch, a degraded starch, a chemically modified starch or a degraded and chemically modified starch. A native starch is for example a starch from maize (corn), wheat, oats, barley, rice, millet, potato, peas, tapioca, sorghum or sago. A native starch's main component is amylose, amylopectin or a mixture of both. Of interest is also a native starch which has a high amylopectin content such as wax maize starch and wax potato starch. A high amylopectin content is above 90% by weight, in particular in the range from 95 to 100% by weight. A degraded starch has a reduced average molecular weight in comparison to the precursor, which is degraded. Degradation of a starch can be effected enzymatically, oxidatively or through action of an acid or a base. Enzymatic degradation and degradation by action of an acid or a base involve often a hydrolysis, which leads to increased contents of oligosaccharides or dextrins in a degraded starch. A lot of degraded starches are commercially available. Degradation of a starch is a chemical process, but chemical modification of a starch is herein differentiated from degradation by meaning a modification, which targets the covalent addition of a chemical group to the starch. A chemically modified starch results for example from esterification or etherification of a native starch. The esterification can be supported by an inorganic or an organic acid, wherein the latter one can also be reacted in their anhydride or chloride forms. A common method to etherify a starch consists in treating the starch with an organic compound, which contains a reactive halogen atom, an epoxide functionality or a sulfate group in an aqueous alkaline solution. A known starch ether type is for example an alkyl ether, a hydroxyalkyl ether or a carboxyalkyl ether. A special class of a starch derivative is a chemically modified cationic starch, i.e. a starch derivative having amino groups or ammonium groups. An example for a chemically modified cationic starch is a reaction product of a starch with 2,3-epoxypropyltrimethylammonium chloride. At a chemically modified cationic starch attention has to be paid that the cationic charge does not negatively influence the process or the resulting aqueous dispersion of a polymer P. A lot of chemically modified starches are known and commercially available. A degraded and chemically modified starch is for example a phosphated or an acetylated degraded starch.

A way to characterize the degree of degradation of a starch derivative is the intrinsic viscosity ηi, which is determined in accordance with DIN EN1628 at a temperature of 23° C. The intrinsic viscosity ηi of a degraded starch is preferably less than 0.07 dl/g, in particular in the range from 0.02 to 0.06 dl/g and for example less than 0.05 dl/g. An alternative way to characterize the degree of degradation of a starch is the DE value. DE denotes Dextrose Equivalent and refers to the percentage fraction of the dry substance which is attributable to reducing sugar. It corresponds to the amount of glucose (=dextrose) which would have the same reducing power per 100 g of dry substance. The DE value is a measure of how far polymer degradation of a starch has proceeded. Hence a product obtained having a low DE value retains a high proportion of polysaccharides and a low content of low molecular weight sugars, while a product of high DE value is mainly made up of just low molecular weight sugars only. Dependent on the degree of degradation, two types of a degraded starch are defined. A maltodextrin is a degraded starch with an intrinsic viscosity ηi in the range of 0.06 dl/g to not less than about 0.04 dl/g, a DE value of 3 to 20 and a weight-average molar mass $M_w$ in the range from 15 000 to 20 000 g/mol. A glucose syrup is a degraded starch with an intrinsic viscosity ηi in the range from 0.04 dl/g to 0.02 dl/g, a DE value in the range from 20 to 30 and weight-average molar mass $M_w$ in the range from 3000 to 6000 g/mol. Owing to their method of making, a maltodextrin or a glucose sirup is obtained in the form of an aqueous solution and both are also commercialized as such. An aqueous solution of a maltodextrin has for example a solids content of 50 to 70% by weight and an aqueous solution of a glucose syrup has for example a solids contents of 70 to 95%. Both can also be in a spray-dried form. Especially a maltodextrin is also available spray-dried in a powder form. Particular preference for the process is given to the presence of a starch derivative, which is a degraded native starch, in particular a native starch degraded to maltodextrin or to glucose syrup.

In case of the presence of a starch derivative, the starch derivative is for example present from 15 to 60 parts by weight, in particular from 20 to 50 parts by weight or very particular from 25 to 40 parts by weight of the carbohydrate compound per 100 parts by weight of the monomers to be polymerized, i.e. monomers (a) to (d) and optionally (e), (f) or both of them. The starch derivative is added at the process for example to the aqueous medium in the process. Preferably, the majority of or all of the starch derivative amount is present when polymerizing of the monomers in the presence of a free-radical initiator begins. It is possible to firstly degrade, in particular enzymatically, a native starch in an aqueous solution. After the degradation is stopped, the aqueous solution containing the degraded starch becomes at least partly the medium in which the polymerizing of the monomers occurs. Optionally, the starch derivative is added to the aqueous medium for emulsifying the monomers.

In order to modify the properties of the resulting polymer P, a chain transfer agent can be present during the process. In the presence of the chain transfer agent, a polymer which has a lower weight-averaged molar mass and a smaller K value is obtained in comparison to the polymer obtained in the absence of the chain transfer agent. The K value can be determined in 5% strength aqueous sodium chloride solution at pH 7, 25° C. and a polymer concentration of 0.1% by weight according to H. Fikentscher, Cellulose-Chemie, volume 13, 58-64 and 71-74 (1932). A chain transfer agent is for example a non-polymerizable sulfur-containing organic compound, which is free of a sulfur-oxygen-bond or wherein the sulfur atom is not part of a heterocylic ring, an aldehyde, which is free of a carbon-carbon double bond, a non-polymerizable carboxylic acid, a non-polymerizable alcohol or a non-polymerizable phosphor-containing compound. An example for a non-polymerizable sulfur-containing organic compound, which is free of a sulfur-oxygen-bond or wherein the sulfur atom is not part of a heterocylic ring, is dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid or thiourea. Dodecyl mercaptan is a member of the class of alkyl thiols. An example for an aldehyde, which is free of a carbon-carbon double bond, is formaldehyde, acetaldehyde or propionaldehyde. An example for a non-polymerizable carboxylic acid is formic acid or a salt thereof such as sodium formate or ammonium formate. An example for a non-polymerizable alcohol is isopropanol or 2-butanol. An example for a non-polymerizable phosphorous compound is sodium hypophosphite. A mixture of chain transfer agents is also suitable. If a chain transfer agent is used in the process, the amount is typically 0.01 to 5, preferably from 0.1 to 1.0% by weight based on sum total weight of the monomers to be polymerized, i.e. monomers (a) to (d) and optionally (e), (f) or both of them. The chain transfer agent can be initially added to the aqueous medium prior to the monomers, metered into the polymerization together with or separately from the monomers during the process or portioned between these variants. Preferably, the chain transfer agent is metered into the monomers.

However, it has been found that a process, which contains less alkyl thiol leads to further improved results. Preferred is a process, wherein less than 0.1 parts by weight alkyl thiol based on the sum total weight of the monomers to be polymerized is present, in particular less than 0.05 parts alkyl thiol and very particular less than 0.01 parts alkyl thiol. Especially preferred is a process, which is free of an alkyl thiol.

Preferred is a process, wherein less than 0.1 parts by weight non-polymerizable sulfur-containing organic compound, which is free of a sulfur-oxygen-bond or wherein the sulfur atom is not part of a heterocylic ring, based on the sum total weight of the monomers to be polymerized is present, in particular less than 0.05 parts and very particular less than 0.01 parts. Especially preferred is a process, which is free of a non-polymerizable sulfur-containing organic compound, which is free of a sulfur-oxygen-bond or wherein the sulfur atom is not part of a heterocylic ring.

Preferred is process, which is free of a chain transfer agent, which is a non-polymerizable sulfur-containing organic compound, which is free of a sulfur-oxygen-bond or wherein the sulfur atom is not part of a heterocylic ring, an aldehyde, which is free of a carbon-carbon double bond, a non-polymerizable carboxylic acid, a non-polymerizable alcohol or a non-polymerizable phosphor-containing compound. Especially preferred is a process, which is free of a chain transfer agent.

The pH value of the aqueous medium at the polymerizing of the monomers in the presence of a free-radical initiator is for example in the range from 2 to 6, in particular from 3 to 6 and very particular from 4 to 5. As previously mentioned already for the monomers, a monomer and other components in the process, which comprise acid groups, can be present in the process in the form of their free acids and in specific cases in an anhydride form, or partially or completely neutralized in a salt form depending on the pH value. Adjustments of the pH value of the aqueous medium are preferably conducted with an alkali metal hydroxide solution or ammonia solution. Preference is given to use aqueous sodium hydroxide solution, aqueous potassium hydroxide solution or ammonia as a neutralizing agent.

After the step of polymerizing the monomers in the presence of a free-radical initiator and the optional step of removing residual, unreacted monomers, the reaction product can be filtered to remove possible coagulum from the aqueous dispersion of the polymer P.

At the end of the process, the pH value of the aqueous dispersion of the polymer P can be adjusted, for example to a pH value of between 6 and 7.

In the aqueous polymer dispersion of the polymer P, the dispersed particles of the polymer P have an average particle diameter of preferably 80 to 300 nm and more particularly 90 to 250 nm. The average particle diameter of the polymer particles can be determined by dynamic light scattering on a 0.005% to 0.01% by weight aqueous polymer dispersion at 23° C. by means of an Autosizer IIC from Malvern Instruments, England. The reported data are all based on the cumulant z-average diameter of the measured autocorrelation function as per ISO standard 13321.

The solids content of the aqueous polymer dispersion of the polymer P is for example more than 40% by weight, for example at least 50% by weight. A corresponding solids content can be effected for example through appropriate adjustment of the amount of aqueous medium in relation to the monomers and other components in the process.

For the process for preparing an aqueous dispersion of a polymer P, the following combinations of monomers (a) to (d) and optionally (e), (f) or both of them are preferred.

Preferred is a process for preparing an aqueous dispersion of a polymer P, wherein the the provided monomers are (a) vinyl acetate,
(b) at least one acrylate monomer, which is a $C_1$-$C_{10}$ alkyl acrylate or a $C_1$-$C_{10}$ alkyl methacrylate,
(c) at least one α,β-ethylenically unsaturated $C_3$-$C_6$ carboxylic acid,
(d) glycidyl methacrylate or glycidyl acrylate,
(e) optionally at least one ethylenically unsaturated sulfonic acid, and
(f) optionally at least one ethylenically unsaturated other monomer, which is different to the monomers (a), (b), (c), (d) or (e), and which is different to a vinylaromatic compound or a conjugated aliphatic diene.

Preferred is a process for preparing an aqueous dispersion of a polymer P, wherein the the provided monomers are
(a) vinyl acetate,
(b) at least one acrylate monomer, which is n-butyl acrylate or ethylhexyl acrylate,
(c) at least one α,β-ethylenically unsaturated $C_3$-$C_6$ carboxylic acid,
(d) glycidyl methacrylate or glycidyl acrylate,
(e) optionally at least one ethylenically unsaturated sulfonic acid, and
(f) optionally at least one ethylenically unsaturated other monomer, which is different to the monomers (a), (b), (c), (d) or (e).

Preferred is a process for preparing an aqueous dispersion of a polymer P, wherein the the provided monomers are
(a) vinyl acetate,
(b) the at least one acrylate monomer is n-butyl acrylate,
(c) at least one α,β-ethylenically unsaturated $C_3$-$C_6$ carboxylic acid,
(d) glycidyl methacrylate or glycidyl acrylate,
(e) optionally at least one ethylenically unsaturated sulfonic acid, and
(f) optionally at least one ethylenically unsaturated other monomer, which is different to the monomers (a), (b), (c), (d) or (e).

Preferred is a process for preparing an aqueous dispersion of a polymer P, wherein the the provided monomers are
(a) vinyl acetate,
(b) at least one acrylate monomer, which is a $C_1$-$C_{10}$ alkyl acrylate or a $C_1$-$C_{10}$ alkyl methacrylate,
(c) at least one α,β-ethylenically unsaturated $C_3$-$C_6$ carboxylic acid, which is acrylic acid, methacrylic acid, crotonic acid, fumaric acid, maleic acid, maleic acid anhydride, 2-methyl maleic acid, 2-methyl maleic acid anhydride or itaconic acid,
(d) glycidyl methacrylate or glycidyl acrylate,
(e) optionally at least one ethylenically unsaturated sulfonic acid, and
(f) optionally at least one ethylenically unsaturated other monomer, which is different to the monomers (a), (b), (c), (d) or (e).

Preferred is a process for preparing an aqueous dispersion of a polymer P, wherein the the provided monomers are
(a) vinyl acetate,
(b) at least one acrylate monomer, which is a $C_1$-$C_{10}$ alkyl acrylate or a $C_1$-$C_{10}$ alkyl methacrylate,
(c) at least one α,β-ethylenically unsaturated $C_3$-$C_6$ carboxylic acid,
(d) glycidyl methacrylate,
(e) optionally at least one ethylenically unsaturated sulfonic acid, and
(f) optionally at least one ethylenically unsaturated other monomer, which is different to the monomers (a), (b), (c), (d) or (e).

Preferred is a process for preparing an aqueous dispersion of a polymer P, wherein the the provided monomers are
(a) vinyl acetate,
(b) at least one acrylate monomer, which is a $C_1$-$C_{10}$ alkyl acrylate or a $C_1$-$C_{10}$ alkyl methacrylate,
(c) at least one α,β-ethylenically unsaturated $C_3$-$C_6$ carboxylic acid,
(d) glycidyl methacrylate or glycidyl acrylate,
(e) at least one ethylenically unsaturated sulfonic acid, which is preferably vinyl sulfonic acid or 2-acrylamido-2-methylpropane sulfonic acid, and
(f) optionally at least one ethylenically unsaturated other monomer, which is different to the monomers (a), (b), (c), (d) or (e).

Preferred is a process for preparing an aqueous dispersion of a polymer P, wherein the the provided monomers are
(a) vinyl acetate,
(b) at least one acrylate monomer, which is a $C_1$-$C_{10}$ alkyl acrylate or a $C_1$-$C_{10}$ alkyl methacrylate,
(c) at least one α,β-ethylenically unsaturated $C_3$-$C_6$ carboxylic acid,
(d) glycidyl methacrylate or glycidyl acrylate,
(e) optionally at least one ethylenically unsaturated sulfonic acid, and
(f) optionally at least one ethylenically unsaturated other monomer, which is different to the monomers (a), (b), (c), (d) or (e), and which is an alkene, a cycloalkene, a conjugated aliphatic $C_4$-$C_9$ diene, an ester of vinyl alcohol and a $C_2$-$C_{15}$ monocarboxylic acid, a $C_5$-$C_{10}$ cycloalkyl acrylate, a $C_5$-$C_{10}$ cycloalkyl methacrylate, di($C_1$-$C_{10}$ alkyl) maleinate, di($C_1$-$C_{10}$ alkyl) fumarate, a vinylaromatic compound, an ethylenically unsaturated $C_3$-$C_8$-monocarbonitrile, an ethylenically unsaturated $C_4$-$C_8$-dicarbonitrile, an ethylenically unsaturated $C_3$-$C_8$ monocarboxamide, an ethylenically unsaturated $C_4$-$C_8$ dicarboxamide, ureido methacrylate, ureido acrylate, allyl methacrylate or allyl acrylate.

Preferred is a process for preparing an aqueous dispersion of a polymer P, wherein the the provided monomers are
(a) vinyl acetate,
(b) at least one acrylate monomer, which is n-butyl acrylate or ethylhexyl acrylate,
(c) at least one α,β-ethylenically unsaturated $C_3$-$C_6$ carboxylic acid, which is acrylic acid, methacrylic acid, crotonic acid, fumaric acid, maleic acid, maleic acid anhydride, 2-methyl maleic acid, 2-methyl maleic acid anhydride or itaconic acid,
(d) glycidyl methacrylate or glycidyl acrylate,
(e) optionally at least one ethylenically unsaturated sulfonic acid, and
(f) optionally at least one ethylenically unsaturated other monomer, which is different to the monomers (a), (b), (c), (d) or (e).

Preferred is a process for preparing an aqueous dispersion of a polymer P, wherein the the provided monomers are
(a) vinyl acetate,
(b) at least one acrylate monomer, which is n-butyl acrylate,
(c) at least one α,β-ethylenically unsaturated $C_3$-$C_6$ carboxylic acid, which is acrylic acid or methacrylic acid,
(d) glycidyl methacrylate or glycidyl acrylate,
(e) optionally at least one ethylenically unsaturated sulfonic acid, and
(f) optionally at least one ethylenically unsaturated other monomer, which is different to the monomers (a), (b), (c), (d) or (e).

Preferred is a process for preparing an aqueous dispersion of a polymer P, wherein the the provided monomers are (a) vinyl acetate,
(b) at least one acrylate monomer, which is n-butyl acrylate,
(c) at least one α,β-ethylenically unsaturated $C_3$-$C_6$ carboxylic acid, which is acrylic acid or methacrylic acid,
(d) glycidyl methacrylate or glycidyl acrylate,
(e) optionally at least one ethylenically unsaturated sulfonic acid, which is vinylsulfonic acid, and
(f) optionally at least one ethylenically unsaturated other monomer, which is different to the monomers (a), (b), (c), (d) or (e).

Preferred is a process for preparing an aqueous dispersion of a polymer P, wherein the the provided monomers are
(a) vinyl acetate,
(b) at least one acrylate monomer, which is n-butyl acrylate,
(c) at least one α,β-ethylenically unsaturated $C_3$-$C_6$ carboxylic acid, which is acrylic acid or methacrylic acid,
(d) glycidyl methacrylate or glycidyl acrylate,
(e) at least one ethylenically unsaturated sulfonic acid, which is vinylsulfonic acid, and
(f) optionally at least one ethylenically unsaturated other monomer, which is different to the monomers (a), (b), (c), (d) or (e).

For the process for preparing an aqueous dispersion of a polymer P, the following contents of monomers (a) to (d) and optionally (e), (f) or both of them are preferred.

Preferred is a process for preparing an aqueous dispersion of a polymer P, wherein in
the content of vinyl acetate is from 75 to 85 parts by weight of the monomers,
the content of the at least one acrylate monomer is from 7 to 19 parts by weight of the monomers,
the content of the at least one α,β-ethylenically unsaturated $C_3$-$C_6$ carboxylic acid is from 0.5 to 5 parts by weight of the monomers,
the content of glycidyl methacrylate or glycidyl acrylate is from 0.5 to 8 parts by weight of the monomers,
the optional content of the at least one ethylenically unsaturated sulfonic acid is from 0.1 to 2 parts by weight of the monomers,
the optional content of the at least one other ethylenically unsaturated monomer is from 0.1 to 10 parts by weight of the monomers, and
the sum total of the parts by weight of the monomers (a), (b), (c), (d), (e) and (f) is 100.

Preferred is a process for preparing an aqueous dispersion of a polymer P, wherein in
the content of vinyl acetate is from 78 to 83 parts by weight of the monomers,
the content of the at least one acrylate monomer is from 9 to 16 parts by weight of the monomers,
the content of the at least one α,β-ethylenically unsaturated $C_3$-$C_6$ carboxylic acid is from 0.5 to 3 parts by weight of the monomers,
the content of glycidyl methacrylate or glycidyl acrylate is from 0.5 to 8 parts by weight of the monomers,
the optional content of the at least one ethylenically unsaturated sulfonic acid is from 0.1 to 1 parts by weight of the monomers,
the optional content of the at least one other ethylenically unsaturated monomer is from 0.1 to 8 parts by weight of the monomers, and
the sum total of the parts by weight of the monomers (a), (b), (c), (d), (e) and (f) is 100.

Preferred is a process for preparing an aqueous dispersion of a polymer P, which comprises the steps of
providing the monomers
(a) vinyl acetate,
(b) at least one acrylate monomer, which is a $C_1$-$C_{10}$ alkyl acrylate or a $C_1$-$C_{10}$ alkyl methacrylate,
(c) at least one α,β-ethylenically unsaturated $C_3$-$C_6$ carboxylic acid,
(d) glycidyl methacrylate or glycidyl acrylate,
(e) at least one ethylenically unsaturated sulfonic acid, and
(f) optionally at least one ethylenically unsaturated other monomer, which is different to the monomers (a), (b), (c), (d) or (e),
emulsifying the monomers in an aqueous medium, and
polymerizing the monomers in the presence of a free-radical initiator, wherein
the content of vinyl acetate is from 70 to 95 parts by weight of the monomers,
the content of the at least one acrylate monomer is from 5 to 25 parts by weight of the monomers,
the content of the at least one α,β-ethylenically unsaturated $C_3$-$C_6$ carboxylic acid is from 0.1 to 10 parts by weight of the monomers,
the content of glycidyl methacrylate or glycidyl acrylate is from 0.1 to 10 parts by weight of the monomers,
the content of the at least one ethylenically unsaturated sulfonic acid is from 0.1 to 5 parts by weight of the monomers,
the optional content of the at least one other ethylenically unsaturated monomer is from 0.1 to 15 parts by weight of the monomers, and
the sum total of the parts by weight of the monomers (a), (b), (c), (d), (e) and (f) is 100.

Preferred is a process for preparing an aqueous dispersion of a polymer P, which comprises the steps of
providing the monomers
(a) vinyl acetate,
(b) at least one acrylate monomer, which is a $C_1$-$C_{10}$ alkyl acrylate or a $C_1$-$C_{10}$ alkyl methacrylate,
(c) at least one α,β-ethylenically unsaturated $C_3$-$C_6$ carboxylic acid,
(d) glycidyl methacrylate or glycidyl acrylate,
(e) at least one ethylenically unsaturated sulfonic acid, and
(f) optionally at least one ethylenically unsaturated other monomer, which is different to the monomers (a), (b), (c), (d) or (e),
emulsifying the monomers in an aqueous medium, and
polymerizing the monomers in the presence of a free-radical initiator,
wherein
the content of vinyl acetate is from 70 to 85 parts by weight of the monomers,
the content of the at least one acrylate monomer is from 5 to 25 parts by weight of the monomers,
the content of the at least one α,β-ethylenically unsaturated $C_3$-$C_6$ carboxylic acid is from 0.1 to 10 parts by weight of the monomers,
the content of glycidyl methacrylate or glycidyl acrylate is from 0.1 to 10 parts by weight of the monomers,
the content of the at least one ethylenically unsaturated sulfonic acid is from 0.1 to 5 parts by weight of the monomers,
the optional content of the at least one other ethylenically unsaturated monomer is from 0.1 to 15 parts by weight of the monomers, and the sum total of the parts by weight of the monomers (a), (b), (c), (d), (e) and (f) is 100.

The above described preferences are described for a process for preparing an aqueous dispersion of a polymer P. These preferences for the process apply also to the further embodiments of the invention.

A further embodiment of the invention relates to an aqueous dispersion of a polymer P, which is obtainable by a process, which comprises the steps of
providing the monomers
(a) vinyl acetate,
(b) at least one acrylate monomer, which is a $C_1$-$C_{10}$ alkyl acrylate or a $C_1$-$C_{10}$ alkyl methacrylate,
(c) at least one α,β-ethylenically unsaturated $C_3$-$C_6$ carboxylic acid,
(d) glycidyl methacrylate or glycidyl acrylate,
(e) optionally at least one ethylenically unsaturated sulfonic acid, and
(f) optionally at least one ethylenically unsaturated other monomer, which is different to the monomers (a), (b), (c), (d) or (e),
emulsifying the monomers in an aqueous medium, and
polymerizing the monomers in the presence of a free-radical initiator,
wherein
the content of vinyl acetate is from 70 to 95 parts by weight of the monomers,
the content of the at least one acrylate monomer is from 5 to 25 parts by weight of the monomers,
the content of the at least one α,β-ethylenically unsaturated $C_3$-$C_6$ carboxylic acid is from 0.1 to 10 parts by weight of the monomers,
the content of glycidyl methacrylate or glycidyl acrylate is from 0.1 to 10 parts by weight of the monomers,
the optional content of the at least one ethylenically unsaturated sulfonic acid is from 0.1 to 5 parts by weight of the monomers,
the optional content of the at least one other ethylenically unsaturated monomer is from 0.1 to 15 parts by weight of the monomers, and
the sum total of the parts by weight of the monomers (a), (b), (c), (d), (e) and (f) is 100.

A biocide can be added to the aqueous dispersion of a polymer P to inhibit microbial activity. A biocide is for example 1,2-benzisothiazol-3(2H)-one, 2-methyl-4-isothiazolin-3-one or 5-chloro-2-methyl-4-isothiazolin-3-one. A mixture of biocides is also suitable.

A further embodiment of the invention relates to a powder containing a polymer P, which is obtainable by drying of an aqueous dispersion of the polymer P, which is obtainable by the process for preparing an aqueous dispersion of the polymer P as described in the second to last paragraph. Drying of an aqueous dispersion of a polymer P is of interest, if for example the transportation costs of the contained water are to be avoided. For obtaining a powder form out of the aqueous dispersion of a polymer P, a careful drying is necessary to avoid the formation of a coagulated form of the polymer P. A spray-drying or a freeze-drying is a possibility. A spray-drying has to be carefully conducted, for example at a temperature below the Tg of the polymer P obtained after removal of water from the aqueous dispersion. Another option is the addition of an auxiliary ingredient, which supports the formation of a powder form at drying. A content of an emulsifier or a protective colloid, which is higher than necessary for stabilizing the aqueous dispersion of a polymer P after its formation, can help to allow a peptization of the dried powder form after addition of water.

A further embodiment of the invention relates to a paper coating slip comprising
(i) an inorganic pigment, and
(ii) an aqueous dispersion of a polymer P, which is obtainable by a process for preparing an aqueous dispersion of the polymer P as described in the third to last paragraph, or water and a powder containing a polymer P as described in the last paragraph.

A paper coating slip generally comprises an inorganic pigment, a binder, water and optionally a further auxiliary ingredient. In the present paper coating slip, the polymer P from the aqueous dispersion or from the powder acts after drying of the paper coating slip on the paper as a binder, e.g. it fixes the inorganic pigment to a surface of the paper. Additionally, further functions of a binder in paper coating slips are also served by the dried polymer P, e.g. levelling of inhomogeneity in the paper surface such as sinks and holes, filling parts of the cavities between inorganic pigment particles in the coating layer, supporting formation of a mechanically stable coating layer on the surface of the paper or imparting a certain resistance to humidity.

A desired viscosity of the paper coating slip can be established by addition of further water. Water can also be introduced into the paper coating slip from the formulations of the inorganic pigment, for example as aqueous slurry, or optionally a further auxiliary ingredient in an aqueous form. A solids content of the paper coating slip is typically in the range from 30 to 70% by weight. A high solids content is desired to reduce the amount of water, which has to be removed upon drying of the wet coated paper to receive a dried coated paper. The pH of the paper coating slip is preferably adjusted to values of from 6 to 10, in particular from 7 to 9.5.

Preferably, the content of an inorganic pigment is from 80 to 95 parts by weight based on the total solids content of the paper coating slip. Preferably, the content of the polymer P is from 0.5 to 20 parts by weight based on the total solids content of the paper coating slip. In particular, the content of the inorganic pigment is from 80 to 95 parts by weight based on the total solids content of the paper coating slip, and the content of the polymer P is from 0.5 to 20 parts by weight based on the total solids content of the paper coating slip.

An inorganic pigment is for example a metal salt, in particular a calcium sulfate, a barium sulfate, a magnesium carbonate, a calcium carbonate, an aluminate, a silicate, an aluminum oxide, a titanium dioxide, a zinc oxide, a zinc sulfide, a silicon dioxide or an argillaceous earth, which is different to the aforementioned substances. A mixture of inorganic pigments is also suitable. Preferred is an inorganic pigment, which is a white pigment. A white pigment is understood herein as a pigment, which has no significant absorption of light at a wavelength of from 400 nm to around 800 nm. Accordingly, a human being perceives the white pigment as colourless. There are several inorganic pigments, which are metal salts, which comprise two or more anionic groups, two or more cationic metals, or both of them. An example thereof is a calcium aluminate sulfate or a two- or three-layered phyllosilicate such as kaolinite, halloysite, talc, montmorillonite, hectorite, nontronite or saponite. Preferred is an inorganic pigment, which is a calcium sulfate, a barium sulfate, a magnesium carbonate, a calcium carbonate, an aluminate, a silicate, an aluminum oxide, a titanium dioxide, a zinc oxide, a zinc sulfide or a silicon dioxide. Especially preferred is an inorganic pigment, which is a calcium sulfate, a calcium aluminate sulfate, a barium sulfate, a magnesium carbonate, a calcium carbonate, a silica, an alumina, an aluminum hydrate, a silicate, a titanium dioxide, a zinc oxide, a kaolin, a talc or a silicon dioxide. The calcium carbonate may be a natural ground calcium carbonate (GCC), a precipitated calcium carbonate (PCC), a lime or a chalk. Suitable calcium carbonate pigments are available, for example as Covercarb 60 (RTM Omya), Hydrocarb 60 (RTM Omya) or Hydrocarb 90 ME. Other suitable inorganic pigments are also available, for example as Hydrogloss 90 (clay, RTM KaMin) or Finntalc C10 (talc, RTM Mondo Minerals).

The optional further auxiliary ingredient, which is different to the polymer P, is for example a thickener, a further polymeric binder, an optical brightener, a flow control agent, a further dispersing auxiliary, a surfactant, a lubricant, a further neutralizing agent, a defoamer, a deaerator, a preservative or a dye. A thickener helps to further optimize viscosity and water retention of the paper coating slip. A thickener is for example a cross-linked polyacrylate or a cellulose derivative such as carboxymethylcellulose. A thickener is preferably used in an amount of from 0.05 to 5, in particular from 0.1 to 2 parts by weight, based on 100 parts by weight of the inorganic pigment. A further polymeric binder can be a starch-based binder or an emulsion polymer. A starch-based binder is for example a further starch derivative, which can be added independently from a starch derivative in the process for preparing an aqueous dispersion of a polymer P. In case of a starch-based binder, the further starch derivative can be a native, chemically modified or degraded starch. The chemically modified starch may be a starch ester or a starch ether. For a starch-based binder, preferred is a native starch, in particular native cereal, corn or potato starch. An emulsion polymer is for example a copolymer of styrene and butadiene or a copolymer of styrene and an acrylate. An optical brightener is for example a stilbene derivative, in particular a di-, tetra- or hexasulfonate bistriazinyl-substituted 4,4'-diaminostilbene. A further dispersing auxiliary is for example an emulsifier or a protective colloid as described at the process for preparing an aqueous dispersion of a polymer P and can be added independently from a dispering auxiliary in the process for preparing an aqueous dispersion of a polymer P. A lubricant is for example a stearate such as calcium stearate or a wax. A further neutralizing agent is used to adjust the pH value of the paper coating slip as previously mentioned. The further neutralizing agent can be added independently from a neutralizing agent employed in the process for preparing an aqueous dispersion of a polymer P and is for example sodium hydroxide or ammonium hydroxide. A preservative is for example a further biocide, which can be added independently from a biocide in the process for preparing an aqueous dispersion of a polymer P. A dye for is example an organic pigment with a strong absorption at a wavelength between 400 nm and 800 nm or a soluble compound with a strong absorption at a wavelength between 400 nm and 800 nm. A preferred dye is a soluble compound or a combination of a soluble dye with an organic pigment.

Preferred is a paper coating slip, which contains an auxiliary ingredient, wherein the auxiliary ingredient is different to a polymer P and is a thickener, a further polymeric binder, an optical brightener, a flow control agent, a further dispersant, a surfactant, a lubricant, a further neutralizing agent, a defoamer, a deaerator, a preservative or a dye.

The preferences for the paper coating slip applies also to the following embodiment of a process for coating a paper or a cardboard and a paper or a cardboard obtainable by that process.

A further embodiment of the invention relates to a process for coating a paper or a cardboard, which comprises the steps of
   providing an aqueous dispersion of a polymer P or a powder containing a polymer P,
   preparing a paper coating slip from the provided aqueous dispersion or water and the provided powder, from an inorganic pigment and optionally from an auxiliary ingredient,
   applying the prepared paper coating slip to at least one surface of the paper or the cardboard, and
   drying of the at least one surface of the paper or the cardboard,
wherein the aqueous dispersion of a polymer P is obtainable by a process, which comprises the steps of
   providing the monomers
   (a) vinyl acetate,
   (b) at least one acrylate monomer, which is a $C_1$-$C_{10}$ alkyl acrylate or a $C_1$-$C_{10}$ alkyl methacrylate,
   (c) at least one α,β-ethylenically unsaturated $C_3$-$C_6$ carboxylic acid,
   (d) glycidyl methacrylate or glycidyl acrylate,
   (e) optionally at least one ethylenically unsaturated sulfonic acid, and
   (f) optionally at least one ethylenically unsaturated other monomer, which is different to the monomers (a), (b), (c), (d) or (e),
   emulsifying the monomers in an aqueous medium, and
   polymerizing the monomers in the presence of a free-radical initiator,
   wherein
      the content of vinyl acetate is from 70 to 95 parts by weight of the monomers,
      the content of the at least one acrylate monomer is from 5 to 25 parts by weight of the monomers,
      the content of the at least one α,β-ethylenically unsaturated $C_3$-$C_6$ carboxylic acid is from 0.1 to 10 parts by weight of the monomers,
      the content of glycidyl methacrylate or glycidyl acrylate is from 0.1 to 10 parts by weight of the monomers,
      the optional content of the at least one ethylenically unsaturated sulfonic acid is from 0.1 to 5 parts by weight of the monomers,
      the optional content of the at least one other ethylenically unsaturated monomer is from 0.1 to 15 parts by weight of the monomers, and
the sum total of the parts by weight of the monomers (a), (b), (c), (d), (e) and (f) is 100, wherein the powder containing a polymer P is obtainable by drying of an aqueous dispersion of the polymer P, and
wherein the optionally auxiliary ingredient is different to the polymer P and is a thickener, a further polymeric binder, an optical brightener, a flow control agent, a further dispersing auxiliary, a surfactant, a lubricant, a further neutralizing agent, a defoamer, a deaerator, a preservative or a dye.

A paper surface or a cardboard surface can be uncoated or coated. The process can be applied to provide a base coat, a top coat or both of them. The paper coating process is preferably applied to an uncoated base paper surface or to an uncoated cardboard surface. The amount of paper coating slip applied is in general from 1 to 50 g, preferably from 5 to 30 g based on the solids content of the paper coating slip per square meter. The paper coating slip can be applied by a customary application method, for example by means of a size press, a film press, a blade coater, an air brush, a knife coater, a curtain coater or a spray coater.

Drying of the at least one surface of the paper or the cardboard is conducted for example by IR. The surface temperature of the paper surface or the cardboard surface during the drying step has to enable a film formation by the polymer P. Preferably, the surface temperature during the drying step reaches at the at least one surface of the paper or the cardboard the glass transition temperature of the polymer P, which is obtained after removal of water from the aqueous dispersion, or exceeds the latter one. For a fast film formation, the temperature exceeds significantly the glass transition temperature, for example by at least 25° C.

A further embodiment of the invention relates to a paper or a cardboard, which is obtainable by the aforementioned process for coating a paper or a cardboard.

The coated paper or the coated cardboard shows good surface strength, for example a good dry pick resistance, a good wet pick resistance or a good offset test result.

The coated paper or the coated cardboard can be readily printed on in a common printing process, for example a relief printing, a gravure printing, an offset printing, an ink jet printing, a flexographic printing, a newspaper printing, a letterpress printing, a sublimation printing or a laser printing, an electrophotographic printing or a combination of these printing processes. Some of these printing processes are also referred to as digital printing, for example an ink jet printing or an electrographic printing, since no printing plate is necessary.

A further embodiment of the invention relates to the use of an aqueous dispersion of a polymer P, which is obtainable by the process for preparing an aqueous dispersion of a polymer P, or a powder containing a polymer P, which is obtainable by drying of an aqueous dispersion of the polymer P, for providing surface strength to a surface of a paper or a cardboard, wherein the surface of the paper or the cardboard is coated with a paper coating slip containing an inorganic pigment and the aqueous dispersion of a polymer P or water and a powder containing a polymer P.

A further embodiment of the invention relates to the use of an aqueous dispersion of a polymer P or a powder containing a polymer P as a binder, in particular the use of an aqueous dispersion of a polymer P or water and a powder containing a polymer P as a binder. The polymer P possesses adhesive and film forming properties. The use is especially a method for fixing at least two substrates, which comprises the steps of applying a polymer P in a dispersed form, for example as an aqueous dispersion or as a powder containing a polymer P, onto a first substrate, contacting the now at least partly overcast first substrate with a second substrate, which is of the same type as the first substrate or different to the first substrate, optionally drying the formed composite comprising the first substrate, the polymer P and the second substrate to remove water or a volatile organic solvent, and optionally raising the temperature above the glass transition temperature of the polymer P, which is obtained after removal of water from the aqueous dispersion.

The optional steps of drying the formed composite and raising the temperature above the glass transition temperature polymer P can occur concomitantly. The contacting can take place under pressure, which can lead to a binding effect of the polymer P without a need to raise the temperature. If the powder containing a polymer P provides a sufficiently homogenous distribution on the overcast parts of the first substrate, then the addition of water is not necessary.

Accordingly, the polymer P can be used as a binder in different fields of engineering, for example in the production of an adhesive, a sealant, a polymer plaster, a polymer render, a paper coating, a fiber nonwoven, a paint or an impact modifier. The polymer P can also be used as a binder in the consolidation of sand, in textile finishing, in leather finishing or as a binder for modifying mineral binders and plastic pellets.

Preferred is an use of an aqueous dispersion of a polymer P or a powder containing a polymer P as a binder, wherein the binder fixes an inorganic pigment to a surface of a paper or a cardboard. In particular preferred is an use of an aqueous dispersion of a polymer P or water and a powder containing a polymer P as a binder, wherein the binder fixes an inorganic pigment to a surface of a paper or a cardboard.

The invention is illustrated by the non-limiting examples below.

EXAMPLES

Unless the context suggests otherwise, percentages are always by weight. A reported content is based on the content in aqueous solution or dispersion if not stated otherwise.

Solids contents are determined by drying a defined amount of the particular aqueous polymer dispersion (about 5 g) at 140° C. in a drying cabinet to constant weight. Two separate measurements are carried out in each case and averaged.

The glass transition temperature Tg is determined in accordance with the norm ISO 11357-2 by differential scanning calorimetry using a TA8000 series DSC820 instrument from Mettler-Toledo Int. Inc.

The average particle diameters of the polymer particles are determined by dynamic light scattering on a 0.005 to 0.01 wt % aqueous polymer dispersion at 23° C. by means of an Autosizer IIC from Malvern Instruments, England. The cumulant z-average diameter of the measured autocorrelation function (ISO standard 13321) is reported.

Materials Used:

| | |
|---|---|
| VA | vinyl acetate |
| nBA | n-butyl acrylate |
| AA | acrylic acid |
| VS | vinyl sulfonate |
| GMA | glycidyl methacrylate (=2,3-epoxypropyl methacrylate) |
| Amol | N-methylolacrylamide (=N-hydroxymethyl acrylamide) |
| EGDMA | ethylene glycol dimethacrylate |
| DCPA | dicyclopentadieneyl acrylate |
| tDMK | tert-dodecylmercaptan |

The materials are commercially available for example from Aldrich Inc. or BASF SE.

Emulsion Polymerization Procedure for Polymer Dispersion No. D1

A polymerization vessel equipped with a stirrer, reflux condenser and dosing devices is initially charged with 262.94 g of water, 43.75 g of 20 wt % aqueous emulsifier solution of Lutensol AT 18 (RTM BASF, a polyethoxylated fatty alcohol) and 12.25 mg iron(II) sulfate heptahydrate. The mixture is heated to 30° C. under agitation and nitrogen. Then nitrogen flux is stopped and the emulsion feed as well as the initiators feeds are simultaneously started and fed during 4 hours under a constant feed rated. During the first 20 minutes after beginning of the addition of the emulsion and initiator feeds, the temperature is increased from 30° C. to 70° C. The emulsion feed is composed of 252.61 g of water, 32.81 g of 20 wt % aqueous emulsifier solution of Lutensol AT 18, 20.51 g of 32 wt % aqueous emulsifier solution of Disponil FES 77 (RTM BASF, an alkyl polyglyol ether sulfate), 17.50 g of 25 wt % aqueous solution of VS, 17.50 g AA, 43.75 g of GMA, 95.38 g of nBA and 714.00 g of VA. One initiator feed is composed of 105.00 g of a 2.5 wt % solution of sodium peroxodisulfate and the other initiator feed is composed of 43.69 g of water, 1.75 g of sodium acetate and 1.49 g of Rongalit C (RTM BASF, sodium hydroxymethylsulfinate). After the end of the emulsion and initiator feeds, in 10 minutes, 68.25 g of water and 13.67 g of a 32 wt % aqueous solution of Disponil FES 77 are fed in the reactor. Another 20 minutes are waited. After that at 70° C., 21.00 g of a 10 wt % aqueous solution of tert.-butyl hydroperoxide and 29.39 g of a 13.1 wt % aqueous solution of sodium acetone bisulfite are fed during 1 hour. The reactor contents are then cooled down to room temperature and 5.25 g of a 7.5 wt % aqueous solution of Acticid MBS 2550 (RTM Thor, 1,2-benzisothiazol-3(2H)-one/2-methyl-4-isothiazolin-3-one (BIT/MIT)) and 1.58 g of a 1.5 wt % aqueous solution of Acticid MV (RTM Thor, 5-chloro-2-methyl-4-isothiazolin-3-one/2-methyl-4-isothiazolin-3-one (CIT/MIT)) are added, followed by 13.51 g of a 10 wt % aqueous solution of sodium hydroxide. The final dispersion is filtrated with a 500 μm filter to remove the possible coagulum. The dispersion D1 thus produced has a solids content of 50.8%, a pH-value of 5, a particle diameter of 193 nm and a Tg of 34° C.

The polymer dispersions No. D2 to D10 are prepared in analogy. In case of polymer dispersion No. D6, the tDMK is added in the emulsion feed.

Tables 1-A and 1-B shows the employed amounts of monomers and tDMK for the polymer dispersions No. D1 to D10.

TABLE 1-A

| monomer/tDMK | dispersion No. | | | | | |
| --- | --- | --- | --- | --- | --- | --- |
| | D1 $^{a)}$ | D2 $^{a)}$ | D3 $^{a)}$ | D4 $^{b)}$ | D5 $^{b)}$ | D6 $^{a)}$ |
| VA | 81.6 | 81.6 | 81.6 | 81.6 | 81.6 | 81.6 |
| nBA | 10.9 | 12.9 | 14.9 | 15.9 | 12.9 | 10.9 |
| GMA | 5.0 | 3.0 | 1.0 | 0.0 | 5.0 | 5.0 |
| AA | 2.0 | 2.0 | 2.0 | 2.0 | 0.0 | 2.0 |
| VS | 0.5 | 0.5 | 0.5 | 0.5 | 0.5 | 0.5 |
| AAmol | 0.0 | 0.0 | 0.0 | 0.0 | 0.0 | 0.0 |
| EGDMA | 0.0 | 0.0 | 0.0 | 0.0 | 0.0 | 0.0 |
| DCPA | 0.0 | 0.0 | 0.0 | 0.0 | 0.0 | 0.0 |
| tDMK | 0.0 | 0.0 | 0.0 | 0.0 | 0.0 | 0.15 |

TABLE 1-B

| monomer/tDMK | dispersion No. | | | |
| --- | --- | --- | --- | --- |
| | D7 $^{b)}$ | D8 $^{b)}$ | D9 $^{b)}$ | D10 $^{a)}$ |
| VA | 81.6 | 81.6 | 81.6 | 81.6 |
| nBA | 13.9 | 13.9 | 12.9 | 11.4 |
| GMA | 0.0 | 0.0 | 0.0 | 5.0 |
| AA | 2.0 | 2.0 | 2.0 | 2.0 |
| VS | 0.5 | 0.5 | 0.5 | 0.0 |
| AAmol | 2.0 | 0.0 | 0.0 | 0.0 |
| EGDMA | 0.0 | 2.0 | 0.0 | 0.0 |
| DCPA | 0.0 | 0.0 | 3.0 | 0.0 |
| tDMK | 0.0 | 0.0 | 0.0 | 0.0 | a): according to the invention
b): comparative

Procedure for a Paper Coating Slip Containing a Polymer Dispersion

In a stirred assembly, the individual components are fed in succession. The pigments are added in a pre-dispersed slurry form. The other components are added after the pigments, the order corresponding to the order in the reported coating slip formulation. Final solids content is set by adding water.

Composition of the paper coating slip formulation based on solids content of the components:
  100 parts of finely divided calcium carbonate (Hydrocarb 60, RTM Omya)
  7 parts of one of the polymer dispersions No. D1 to D10 as binder
  0.25 parts of a thickener (Sterocoll FS, RTM BASF)

The solids content of the paper coating slip is 64 wt % and its pH is about 9.

Paper Coated with a Coating Slip Containing a Polymer Dispersion and its Surface Strength The paper coating slip containing a polymer dispersion, i.e. one of the polymer dispersions No. D1 to D10, is applied to one side of uncoated base paper (woodfree, 70 g/m$^2$) using a laboratory coating machine and dried via IR radiator. The weight of the coat applied is about 10 g/m$^2$ as determined by gravimetric measurement. The paper is cut into sheets and calendered on a lab calendar to give even and flat sheets. Before conducting the surface strength tests, the paper sheets are conditioned for at least 15 hours at 23° C. and 50% relative humidity.

The received coated paper is tested for surface strength using the test methods IGT dry pick resistance, IGT wet pick resistance and Offset test, which are known to a person skilled in the art.

Measurement of Dry Pick Resistance with IGT Test Printer (IGT Dry):

Strips are cut out of the in-test papers and printed with the IGT test printer. The printing inks used are specific test inks from Lorilleux, which transmit different tensile forces. The test strips are fed through the press at continuously increasing speed (maximum speed 200 cm/s). To evaluate the result, the point at which 10 picks have occurred on the paper surface after the start of printing is determined on the sample printing strip. The measure reported for dry pick resistance is the speed in cm/sec present at this point during printing and also the test ink used. The higher this printing speed at the tenth pick point, the better the quality rating of the paper surface.

Measurement of Wet Pick Resistance with IGT Test Printer (IGT Wet):

Strips are cut out of the in-test papers and printed with the IGT test printer. The printer is set up such that the test strips are moistened with water prior to the printing operation. The printing inks used are specific test inks from Lorilleux (No. 3807), which transmit different tensile forces. Printing is done at a constant speed of 0.6 cm/s. Picks out of the paper surface are visible as unprinted spots. To determine wet pick resistance, a color densitometer is used to determine color density in % compared with the full hue. The higher the reported color density, the better the wet pick resistance.

Offset Test:

Samples having a size of 240×46 mm are cut out of the in-test papers in the longitudinal direction. An appropriate amount of printing ink is applied to the inking roll and left to run for 1 minute. A printing disk is then inserted and inked for 30 s. The printing speed is 1 m/s. A paper strip is brought back to the starting position on a printing test support with the printed paper strip. After a specified time interval, the printing process is started again without replacing the printing disk. This operation is repeated more than once. After each printing cycle, the pick on the printed side of the paper strip is assessed by visual inspection. The table reports the number of cycles before picking occurred for the first time. The higher the number of cycles up to the occurrence of picking is, the better is the suitability of the papers for offset printing.

The surface strength results of the papers coated with one of the polymer dispersions No. D1 to D10 are summarized in table 2.

TABLE 2

| Paper-No. | applied dispersion-No. | dry pick resistance [cm/s] | wet pick resistance [cm/s] | offset cycles |
|---|---|---|---|---|
| P-1[a] | D1[a] | 65 | 20.9 | 6.75 |
| P-2[a] | D2[a] | 60 | 18.4 | 5.50 |
| P-3[a] | D3[a] | 45 | 13.4 | 5.25 |
| P-4[b] | D4[b] | 31 | 8.9 | 3.50 |
| P-5[b] | D5[b] | 30 | 16.0 | 4.25 |
| P-6[a] | D6[a] | 32 | 19.6 | 4.25 |
| P-7[b] | D7[b] | 21 | 6.0 | 2.00 |
| P-8[b] | D8[b] | 22 | 5.2 | 2.50 |
| P-9[b] | D9[b] | 27 | 12.5 | 3.50 |
| P-10[a] | D10[a] | 30 | 17.0 | 3.25 |

[a] according to the invention
[b] comparative

The measured results of the papers P-1 to P-10 produced with paper coating slips containing one of the polymer dispersion-No. D1 to D10 show that a content of glycidyl methacrylate leads to improved results by comparison of P-1 to P-3 versus P-4;

that a content of acrylic acid leads to improved results by comparison of P-1 versus P-5;

that the absence of tert-dodecylmercaptan leads to further improved results by comparison of P-1 versus P-6;

that a content of glycidyl methacrylate leads to better results than a content of N-methylolacrylamide by comparison of P-2 or P-3 versus P-7;

that a content of glycidyl methacrylate leads to better results than a content of ethylene glycol dimethacrylate by comparison of P-2 or P-3 versus P-8;

that a content of glycidyl methacrylate leads to better results than a content of dicyclopentadieneyl acrylate by comparison of P-1 versus P-9;

that a content of vinyl sulfonate leads to further improved results by comparison of P-1 versus P-10.

The invention claimed is:

1. A process for preparing an aqueous dispersion of a polymer P, the process comprising:
   emulsifying monomers consisting of (a), (b), (c), (d), (e) and optionally (f) in an aqueous medium:
   (a) vinyl acetate,
   (b) at least one acrylate monomer, which is a $C_1$-$C_{10}$ alkyl acrylate or a $C_1$-$C_{10}$ alkyl methacrylate,
   (c) at least one α,β-ethylenically unsaturated $C_3$-$C_6$ carboxylic acid,
   (d) glycidyl methacrylate or glycidyl acrylate,
   (e) at least one ethylenically unsaturated sulfonic acid, and
   (f) at least one ethylenically unsaturated monomer, which is different from the monomers (a), (b), (c), (d) or (e), and is selected from the group consisting of a cycloalkene, a conjugated aliphatic $C_4$-$C_9$ diene, an ester of vinyl alcohol and a $C_2$-$C_{15}$ monocarboxylic acid, a $C_5$-$C_{10}$ cycloalkyl acrylate, a $C_5$-$C_{10}$ cycloalkyl methacrylate, di($C_1$-$C_{10}$ alkyl) maleinate, di($C_1$-$C_{10}$ alkyl) fumarate, a vinylaromatic compound, an ethylenically unsaturated $C_3$-$C_8$-monocarbonitrile, an ethylenically unsaturated $C_4$-$C_8$-dicarbonitrile, an ethylenically unsaturated $C_3$-$C_8$ monocarboxamide, an ethylenically unsaturated $C_4$-$C_8$ dicarboxamide, ureido methacrylate, ureido acrylate, allyl methacrylate or allyl acrylate,
   and
   polymerizing the monomers in the presence of a free-radical initiator,
   wherein
   the content of vinyl acetate is from 70 to 94.7 parts by weight of the monomers,
   the content of the at least one acrylate monomer is from 5 to 25 parts by weight of the monomers,
   the content of the at least one a,b-ethylenically unsaturated $C_3$-$C_6$ carboxylic acid is from 0.1 to 10 parts by weight of the monomers,
   the content of glycidyl methacrylate or glycidyl acrylate is from 0.1 to 10 parts by weight of the monomers,
   the content of the at least one ethylenically unsaturated sulfonic acid is from 0.1 to 5 parts by weight of the monomers,
   the content of the optional at least one other ethylenically unsaturated monomer when present, is from 0.1 to 15 parts by weight of the monomers, and
   the sum total of the parts by weight of the monomers (a), (b), (c), (d), (e) and (f) is 100.

2. The process according to claim 1, wherein the content of vinyl acetate is from 70 to 85 parts by weight of the monomers.

3. The process according to claim 1, wherein
   (b) the at least one acrylate monomer is n-butyl acrylate or ethylhexyl acrylate, and
   (c) the at least one α,β-ethylenically unsaturated $C_3$-$C_6$ carboxylic acid is acrylic acid, methacrylic acid, crotonic acid, fumaric acid, maleic acid, maleic acid anhydride, 2-methyl maleic acid, 2-methyl maleic acid anhydride or itaconic acid.

4. The process according to claim 1, wherein
   (e) the at least one ethylenically unsaturated sulfonic acid is vinyl sulfonic acid or 2-acrylamido-2-methylpropane sulfonic acid.

5. The process according to claim 1, wherein
   (b) the at least one acrylate monomer is n-butyl acrylate,
   (c) the at least one α,β-ethylenically unsaturated $C_3$-$C_6$ carboxylic acid is acrylic acid or methacrylic acid, and
   (e) the at least one ethylenically unsaturated sulfonic acid is vinylsulfonic acid.

6. The process according to claim 1, wherein
   the content of vinyl acetate is from 75 to 85 parts by weight of the monomers,
   the content of the at least one acrylate monomer is from 7 to 19 parts by weight of the monomers,
   the content of the at least one α,β-ethylenically unsaturated $C_3$-$C_6$ carboxylic acid is from 0.5 to 5 parts by weight of the monomers,
   the content of glycidyl methacrylate or glycidyl acrylate is from 0.5 to 8 parts by weight of the monomers,
   the content of the at least one ethylenically unsaturated sulfonic acid is from 0.1 to 2 parts by weight of the monomers,
   the content of the at least one other ethylenically unsaturated monomer when optionally present is from 0.1 to 10 parts by weight of the monomers, and
   the sum total of the parts by weight of the monomers (a), (b), (c), (d), (e) and (f) is 100.

7. The process according to claim 1, wherein the monomers (a), (b), (c), (d), (e) and optionally (f) are chosen in a way such that the polymer P, which is obtained after removal of water from the aqueous dispersion, possesses a glass transition temperature in the range from 20° C. to 40° C. as determined by the norm ISO 11357-2.

* * * * *